4 Sheets—Sheet 1.
W. C. STIFF & A. BOWEN.
MACHINES FOR THE MANUFACTURE OF SCREWS.
No. 192,796. Patented July 3, 1877.
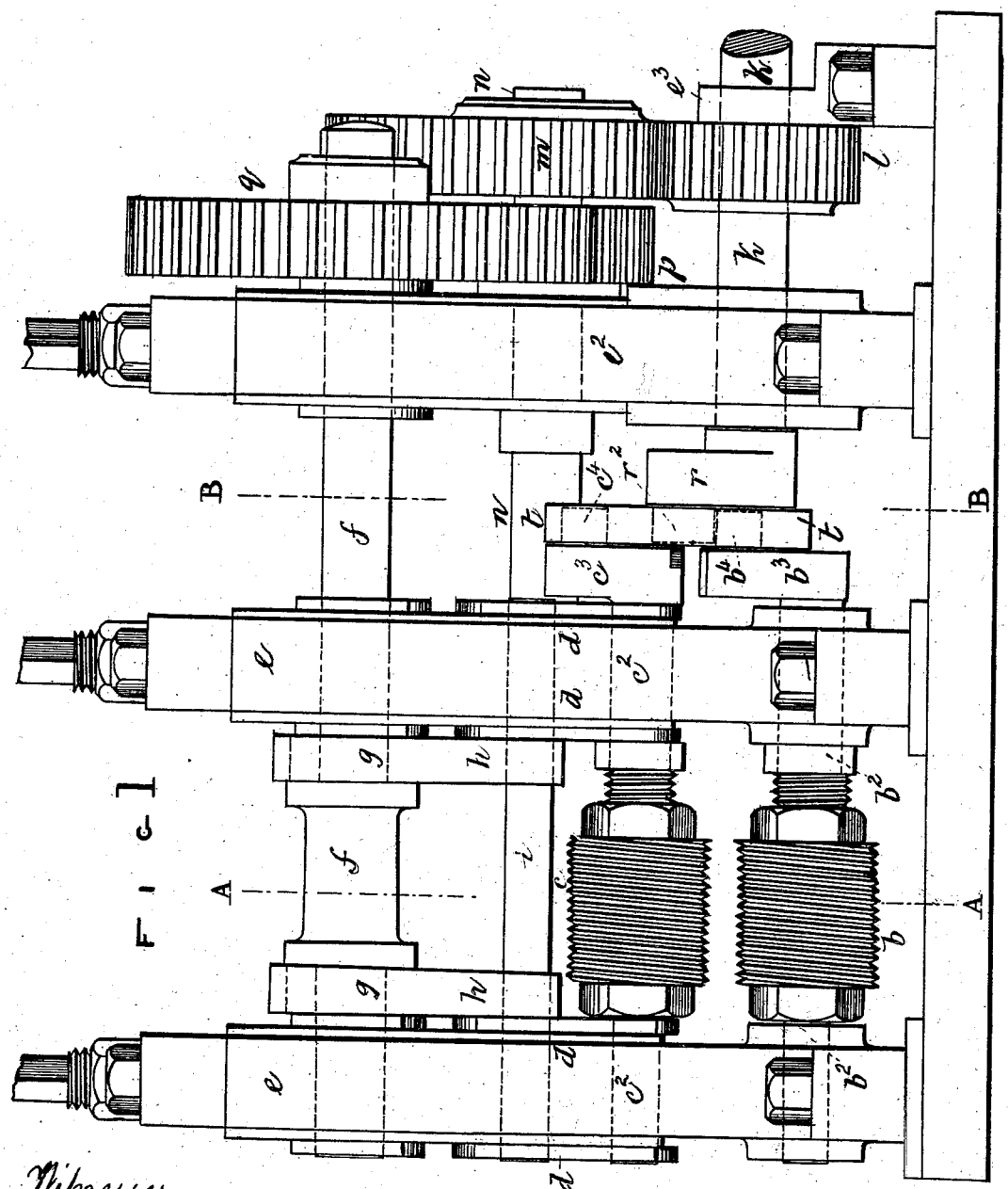
Witnesses,
George Shaw
Richard Skerrett
Inventors
William Charles Stiff
Abraham Bowen

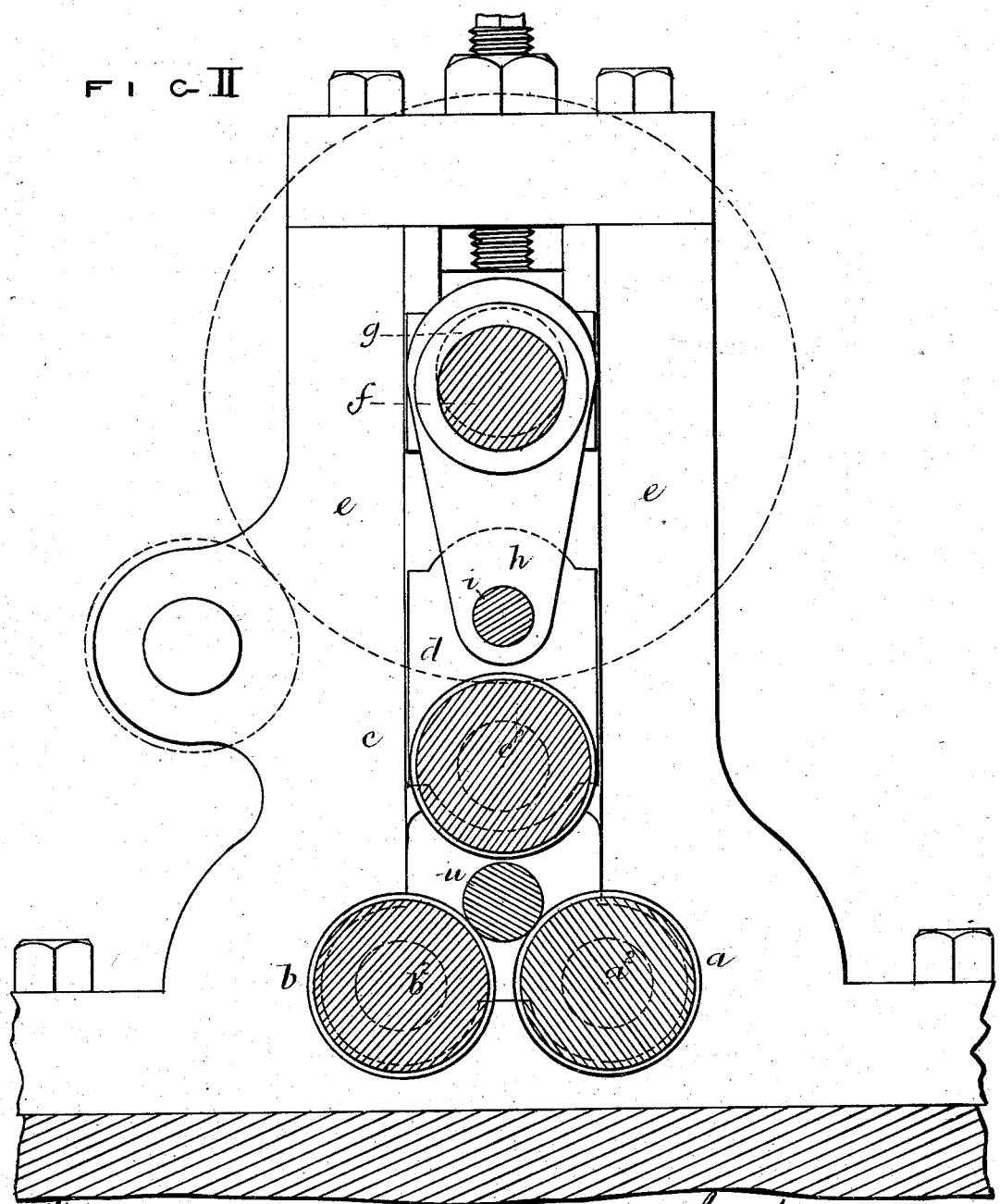

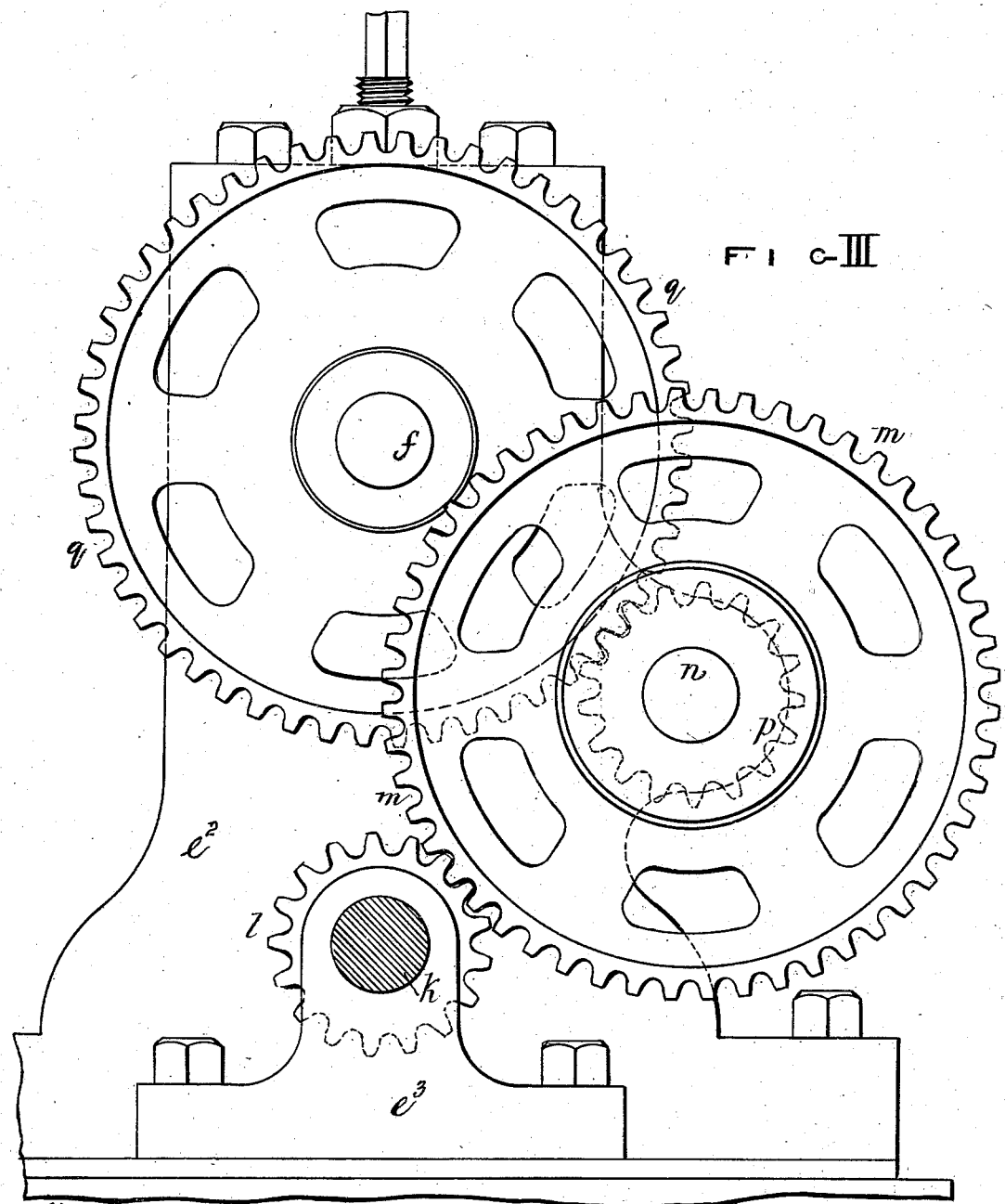

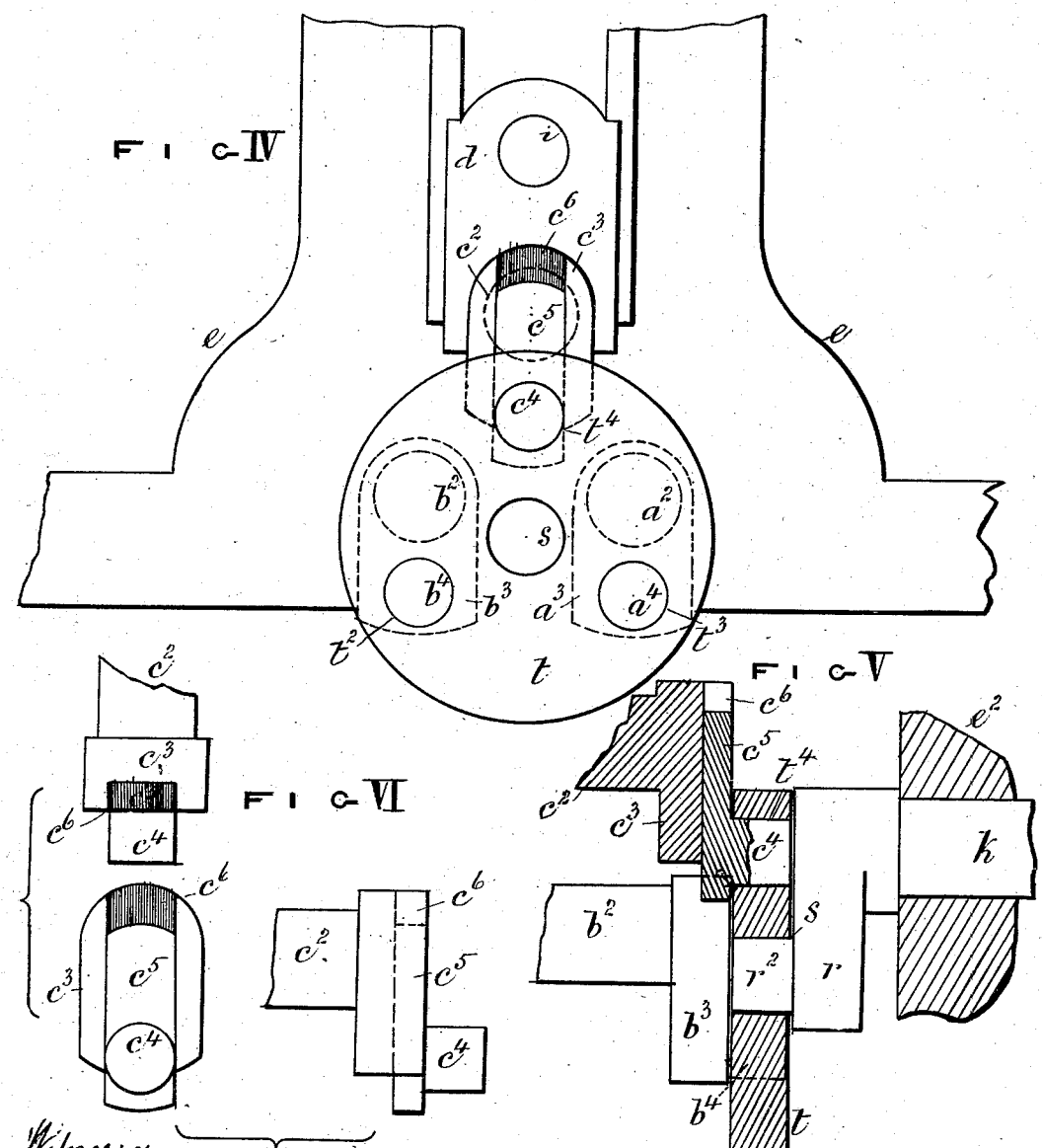

UNITED STATES PATENT OFFICE.

WILLIAM CHARLES STIFF AND ABRAHAM BOWEN, OF BIRMINGHAM, ENGLAND.

IMPROVEMENT IN MACHINES FOR THE MANUFACTURE OF SCREWS.

Specification forming part of Letters Patent No. 192,796, dated July 3, 1877; application filed June 22, 1877.

*To all whom it may concern:*

Be it known that we, WILLIAM CHARLES STIFF, of Birmingham, in the county of Warwick, England, merchant and manufacturer, and ABRAHAM BOWEN, of Birmingham aforesaid, mechanical engineer, have invented new and useful Improvements in Machinery for the Manufacture of Screws, which improvements are fully set forth in the following specification, reference being had to the accompanying drawings.

Our invention has reference to that method of manufacturing screws in which the rod, bar, or blank to be converted into a screw is operated upon by rolls having screw-threads formed on them, by the action of which screw-threaded rolls screw-threads are impressed or formed upon the rod, bar, or blank operated upon by them.

Our said invention consists in the construction and arrangement of the parts of the said machinery hereinafter described, whereby the efficient working of the machinery is more effectually secured than in like machinery as ordinarily constructed. We employ a series of three rolls of large diameter compared with the diameter of the rods, bars, or bolts to be screwed. The said rolls have the required screw-threads formed upon them. Two of the said rolls are mounted in fixed bearings, their axes being parallel and by preference in the same horizontal plane. The other, or third, roll is situated over the other two, its axis being in a plane midway between the planes in which the axis of the lower rolls are respectively situated. The bearings of the upper roll are not fixed, but are capable of sliding vertically in slides formed in the framing of the machine. The rising and falling motion of the top roll is produced by a shaft situated over it, the said shaft carrying eccentrics, the clips of which being connected with the bearings of the said roll give the required rising and falling motion to the said roll on the rotation of the shaft carrying the eccentrics. The said shaft is geared to the principal shaft of the machine by toothed gearing, which gives one rotation to the eccentric shaft to three rotations of the rolls. We do not limit ourselves to that proportion.

The motion of the rolls is effected as follows: The principal shaft of the machine carries a crank, the pin of which engages in a hole in the middle of a vertical plate having in it three holes situated equidistantly from each other and from the middle hole in which the crank-pin of the principal shaft engages. The end of the axis of each roll has a crank, the pins of which cranks enter the three holes, respectively, of the said plate. The cranks on the axes of the lower rolls are of the same length as the crank on the end of the principal shaft, but the crank of the upper roll is capable of lengthening and shortening itself to accommodate the rising and falling of the said upper roll. This lengthening and shortening of the crank of the upper roll is effected by fixing the crank-pin on a slide which works in a groove in the crank, and by the motion of the said slide in the said groove the crank-pin can take a position at a greater or less distance from the axis of the roll. The crank-pin on the said slide of the upper role engages in one of the holes in the plate carried by the crank on the principal shaft in the same way as the crank-pins of the lower rolls engage in the other two holes.

The action of the machine is as follows: Rotation being given to the principal shaft, its crank gives a like rotation to the three rolls through the plate carried by it in the holes, in which plate the crank-pins of the three rolls engage. At the same time the principal shaft through the gearing described communicates a slow rotation to the shaft of the eccentrics, thereby slowly raising and lowering the top roll. The lengthening and shortening of the crank of the top roll permits of the roll rising and falling without its rotatory motion being affected. The bar or bolt to be screwed is introduced by preference in a cold state between the rolls when the top roll is at its highest point. The descent of the top roll causes the bar or bolt to be grasped by the three rolls, by which a rotatory motion is given to it and the screw-threads on the rolls impressed upon it. On the ascent of the top roll the screwed rod or bolt may be removed from the machine.

The lengthening and shortening of the crank of the top roll may be effected in other ways than the one described. For example, the crank-pin may be fixed in the hole in the plate carried by the crank of the principal shaft and engage in a slot or groove in the crank on the top roll with the same effect.

We will now describe, with reference to the accompanying drawings, the manner in which our invention may be operated.

Figure 1 represents in side elevation a machine for the manufacture of screws containing our improvements; and Fig. 2 is a cross-section of the machine taken on the dotted line A A, Fig. 1, the top roll of the machine being represented at its highest position. Fig. 3 is an end elevation of the machine taken at the right-hand end of the machine, Fig. 1. Fig. 4 is a part elevation of the middle standard or upright of the machine and the driving-gear of the rolls, the said Fig. 4 being taken on the line B B, Fig. 1, looking toward the threaded rolls; and Fig. 5 is a longitudinal section of the same. Fig. 6 is a plan, front elevation, and side elevation of the crank, crank-pin, and slide, by which the top threaded roll is driven.

In Figs. 4, 5, and 6 the positions of the cranks and crank-pins of the driving mechanism are different from the positions of the corresponding parts in Fig. 1. The elevation, Fig. 1, is drawn to a smaller scale than the other figures.

The same letters of reference indicate the same parts in the several figures of the drawings.

$a\ b\ c$ are the three threaded rolls of the machine, $a\ b$ being the pair of bottom rolls, and $c$ the top roll, the said top roll having the position with respect to the bottom rolls $a\ b$ represented in Fig. 2. The axes $a^2\ b^2$ of the lower threaded rolls $a\ b$ turn in fixed bearings in the uprights $e\ e$; but the axis $c^2$ of the top threaded roll $c$ works in bearing $d\ d$, capable of sliding vertically in guides formed in the said uprights $e\ e$, for the purpose of giving a rising and falling motion to the said top roll, as hereinafter explained.

The rising and falling motion of the top roll $c$ is effected by a horizontal shaft, $f$, parallel to the axes of the rolls $a\ b\ c$, the said shaft $f$ carrying eccentrics $g\ g$, which act upon clips $h\ h$, the latter being connected to the rod $i$, which passes through the sliding bearings $d\ d$ of the axis of the said top roll $c$.

Motion is transmitted from the principal or driving-shaft $k$, working in the upright $e^2$ and step-bearing $e^3$, to the shaft $f$, carrying the eccentrics $g\ g$, by the following arrangement of gearing: On the said driving or principal shaft $k$ is a pinion, $l$, which gears with a toothed-wheel, $m$, on the parallel shaft $n$. The shaft $n$ of the toothed wheel $m$ carries a pinion, $p$, which gears with a toothed wheel, $q$, on the shaft $f$ of the eccentrics. By giving motion to the shaft $f$ through the gearing $l\ m\ p\ q$, a slow rising and falling motion is imparted by the eccentrics $g\ g$ and clips $h$ $h$, and sliding bearings $d\ d$, to the top roll $c$, one rotation being given to the eccentric shaft $f$ by the said gearing to three rotations of the principal or driving shaft $k$, and consequently three rotations of the threaded rolls $a\ b\ c$.

The rotatory motion of the rolls $a\ b\ c$ is transmitted from the driving-shaft $k$ by the following arrangement of parts: On the inner end of the said driving-shaft $k$ is a crank, $r$, the pin $r^2$ of which engages in a hole, $s$, in the middle of the circular plate $t$. The said plate $t$ has in it three equidistant holes, marked, respectively, $t^2\ t^3\ t^4$, (see Fig. 4,) and the end of the axis of each roll has a crank upon it, the pins of which cranks enter the three holes $t^2\ t^3\ t^4$, respectively, of the said plate $t$.

The crank of the axis of the roll $a$ is marked $a^3$, and its pin $a^4$. The crank of the axis of the roll $b$ is marked $b^3$, and its pin $b^4$, and the crank of the top roll $c$ is marked $c^3$ and its pin $c^4$. The three cranks $a^3\ b^3\ c^3$ are of the same length; but the pin $c^4$ of the crank $c^3$ is not fixed rigidly to the said crank, being formed on the slide $c^5$, which works in a groove, $c^6$, in the said crank $c^3$, as best seen in Figs. 4, 5, and 6. The crank $c^3$ of the top roll is thereby capable of lengthening and shortening itself to accommodate the rising and falling of the said top roll, the crank-pin $c^4$, by the motion of the slide $c^5$, taking a position at a greater or less distance from the axis $c^2$ of the said top roll $c$, according to the vertical height of the said top roll $c$ from the bottom rolls $a\ b$.

By an examination of Figs. 4, 5, and 6, it will be seen that the arrangement by which the lengthening and shortening of the crank $c^3$ of the top roll $c$ is effected permits of the top roll $c$ rising and falling without affecting the rotatory motion of the said top roll, the said top roll rotating at the same speed as the bottom rolls $a\ b$.

Instead of effecting the lengthening and shortening of the crank $c^3$ of the top roll $c$ by the arrangement described and represented, the same object may be attained by fixing the crank-pin $c^4$ of the said crank $c^3$ on the plate $t$, and causing the said crank-pin to engage in a slot or groove in the crank $c^3$. In this arrangement the slide $c^5$ is dispensed with.

By the rotation of the principal shaft $k$ a like rotatory motion is transmitted through the plate $t$ and cranks and crank-pins $a^3\ a^4$, $b^3\ b^4$, $c^3\ c^4$, to the three rolls $a\ b\ c$, the top roll $c$ being at the same time slowly raised and lowered by the eccentrics and clips $g\ h$, operated from the shaft $f$, and the latter driven by the gearing hereinbefore described.

When the top roll $c$ is at its highest point, as represented in Figs. 1 and 2, the bar, rod, or blank to be screwed, marked $u$ in Fig. 2, is introduced between the three rolls $a\ b\ c$. By the descent of the said top roll $c$ the bar, rod, or blank $u$ is grasped between the three rolls, by which a rotatory motion is communicated to it, and the screw-threads on the said rolls impressed upon the said bar, rod, or blank.

On the ascent of the top roll $c$ the screwed rod or bolt $u$ may be removed from the machine, and another rod or blank introduced and screwed in the manner described.

Having now described the nature of our invention, and the manner in which the same is to be performed, we wish it to be understood that we do not limit ourselves to the precise details hereinbefore described and illustrated, as the same may be varied without departing from the nature of our invention; but

We claim as our invention—

In machinery for the manufacture of screws, the combination, with screw-threaded cutting-rolls having fixed bearings, and a screw-threaded cutting-roll having movable bearings, of cranks, the pins of which engage a disk by which rotation is imparted to all said cranks, the pin of the crank of the movable roll being connected with said disk through the intermediary of a slide, substantially as herein more fully shown and described, and for the purpose set forth.

WILLIAM CHARLES STIFF. [L. S.]
ABRAHAM BOWEN. [L. S.]

Witnesses:
  GEORGE SHAW,
  RICHARD SKERRETT,
    *Of 37 Temple Street, Birmingham.*